J. PIETTE.
DISTILLING APPARATUS.
APPLICATION FILED APR. 7, 1917.
1,297,590.
Patented Mar. 18, 1919.
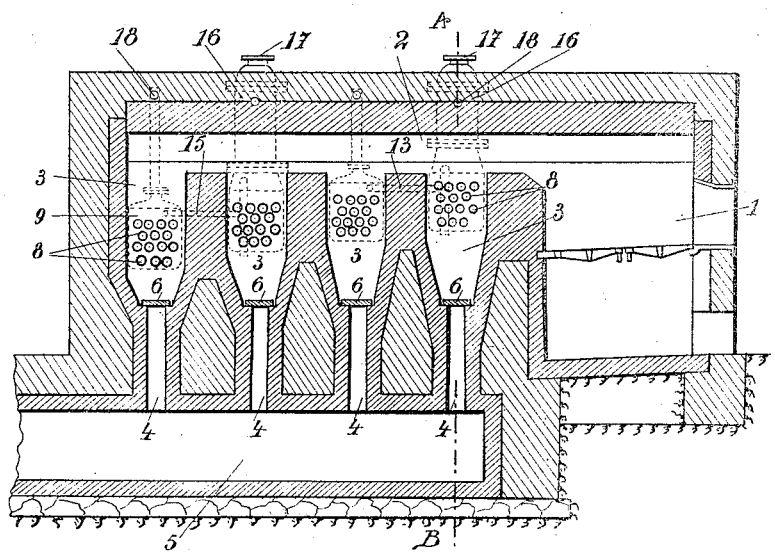
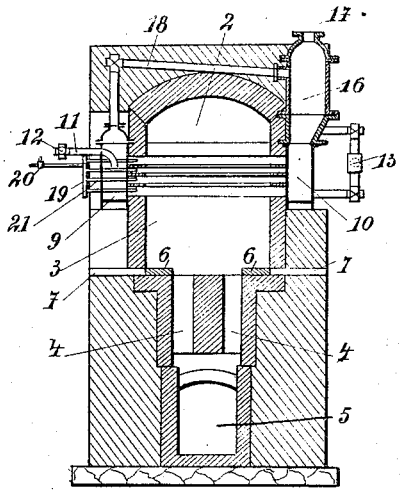
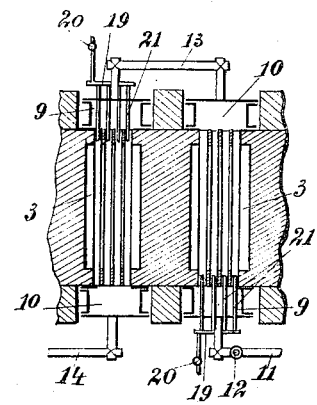
Joseph Piette,
Inventor

UNITED STATES PATENT OFFICE.

JOSEPH PIETTE, OF ST.-GILLES, BRUSSELS, BELGIUM.

DISTILLING APPARATUS.

1,297,590.  Specification of Letters Patent.  Patented Mar. 18, 1919.

Application filed April 7, 1917. Serial No. 160,496.

*To all whom it may concern:*

Be it known that I, JOSEPH PIETTE, a subject of the King of Belgium, residing at St.-Gilles, Brussels, Belgium, have invented certain new and useful Improvements in Distilling Apparatus; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

In the apparatus previously proposed for distilling tar, mineral, vegetable and other oils, the liquid is distilled in vessels provided with steam heated tubes over which the liquid flows in a thin sheet.

The apparatus according to the present invention differs from the known apparatus by the fact that the distillation takes place in nests of tubes quite similar to the nests of tubes usually employed in steam generators, and that a stream of steam is sent through said tubes. With these purposes in view, the tubes of said nests are arranged in the path of the combustion gases of a furnace and are connected at one end to an admission box for the liquid and at the other end to an outlet box, the latter being also provided with a device for the withdrawal of the volatilized components which are the products of the distillation. The steam is introduced in the various tubes by means of suitable pipes at the end near the admission box.

When a continual and fractional distillation is to be performed, the nests of tubes as before described are connected in series and arranged in separate compartments through which the combustion gases of a common furnace are forced to flow, the volume of gases passing in each compartment being regulated by means of dampers. The temperature in each nest of tubes is regulated at will by the quantity of liquid flowing through it, by the quantity of steam admitted and by the volume of heating combustion gases in the compartment.

The arrangement of the nest of tubes renders very easy the cleaning operation of the apparatus, and renders possible a regular heating in the whole mass of the liquid and also a suitable limitation of the quantity of liquid in direct contact with the surfaces heated by the combustion gases.

Another advantage of these nests is that they can easily be arranged in a stream of hot gases.

Steam is sent in each tube of the nest in order that the liquid material to be distilled may be more perfectly stirred up and consequently prevented from being partially decomposed and also in order to obtain in each nest a very constant temperature and to collect from each nest in a continual operation a product of distillation with precisely defined characteristics.

The combination of such nests arranged in series in separate compartments of an oven is advantageous, in that it is possible to regulate easily the fractional separation of the products of the distillation by modifications in the quantity of liquid material flowing through the nests, in the quantity of steam injected in each nest, and in the quantity of hot gases passing through each compartment.

Furthermore, owing to this arrangement, the use of a single furnace for heating the various parts of the apparatus may easily be used.

The accompanying drawing shows by way of example an embodiment of the invention.

Figure 1 is a longitudinal section in the apparatus.

Fig. 2 is a transversal section taken on A—B in Fig. 1.

Fig. 3 is a plan view showing the apparatus partially in section on the level of the tubes.

The distilling plant comprises a furnace 1 with fire-grate, from which the combustion gases reach a distributing horizontal channel 2. The gases escaping from the latter reach the four compartments 3, which are connected by flues 4 with the main flue 5 for the gases. Dampers 6 are slidably arranged so that they may be moved from the outside through slits 7 in the masonry and to stop up more or less the flues 4 in order to regulate the draft and consequently the quantity of combustion gases flowing through each compartment.

In each compartment 3 is arranged a nest of tubes comprising several rows of tubes 8 communicating at one end with an admission box 9 for the liquid and at the other end with an outlet box 10. The position of the admission box and outlet box with respect to the bundle of tubes is alternated in the successive compartments. The liquid to be distilled is led into the admission box 9 of the first compartment, near the furnace, by a pipe 11, provided with a cock 12 by means of which the quantity of liquid flowing toward the apparatus may be regulated. A pipe 13 connects the outlet box 10 of the first nest with the admission box 9 of the second nest, a pipe 14 connects the outlet box of the second nest with the admission box of the third one and a pipe 15 connects the outlet box of the third bundle with the admission box of the fourth one. A suitable evacuation pipe leads away the liquid residuum from the outlet box of the fourth nest of tubes.

Each outlet box 10 is provided with a collecting device 16 in which the volatilized components of each nest of tubes are gathered, and they are then led away through the aperture 17.

A pipe 18 connects the admission box to the outlet box of each nest over the vault of the compartment in order that the gases gathering in the admission box may reach the collector 16.

The steam used for stirring up the material and for carrying away the volatilized components is distributed in each nest of tubes through the admission box. Each distributing device for the steam comprises a collector 19 to which steam is admitted through a pipe provided with a regulating cock 20. From the collector 19 the steam is led by pipes 21 through the admission box 9 and injected in each tube of the nest.

It is to be noted that the various nests of tubes are located in a cascade-like arrangement, that is to say each nest is arranged a little lower than the preceding one, in such a manner that the liquid flows by the action of gravity from each outlet box to the admission box of the next nest.

The temperature of distillation in each nest of tubes may be regulated at will by varying, either separately or simultaneously, the position of cock 12, the position of the dampers 6 of the compartments 3 or the position of the steam cock 20.

After the temperature of distillation has been regulated in this way, the distillation takes place in a continual manner, and the volatilized products forming each fractional part of the liquid are regularly collected at the various apertures 17.

What I claim is:

1. Apparatus for distilling tar, mineral, vegetable and other oils, comprising in combination, a series of nests of tubes arranged in cascade, separate chambers containing said nests of tubes, a furnace for supplying hot gas to each of said chambers, means for admitting steam and oil to the first of said nests of tubes, means for admitting steam to each of the successive nests of tubes, and means for collecting the volatilized components of the oil evolved in said nests of tubes.

2. Apparatus for distilling tar, mineral, vegetable and other oils, comprising in combination, a series of nests of tubes arranged in cascade, separate chambers containing said nests of tubes, a furnace for supplying hot gas to each of said chambers, dampers for controlling the heating effect in each nest of the series, means for admitting steam and oil to the first of said nests of tubes, means for admitting steam to each of the successive nests of tubes, and chambers for collecting the volatilized components of the oil evolved in said nests of tubes.

In testimony whereof I affix my signature in presence of two witnesses.

JOSEPH PIETTE.

Witnesses:
CHARLES MERCHIC,
GUILLAUME AMBROISE.